Dec. 5, 1961     J. D. FORNEY     3,012,131
CARBON ARC TORCH

Filed Jan. 25, 1960     2 Sheets-Sheet 1

INVENTOR.
JACK D. FORNEY
BY
Horace B. Van Valkenburgh
ATTORNEY

Dec. 5, 1961 J. D. FORNEY 3,012,131
CARBON ARC TORCH
Filed Jan. 25, 1960 2 Sheets-Sheet 2

INVENTOR.
JACK D. FORNEY
BY
Horace B. Van Valkenburgh
ATTORNEY

United States Patent Office 3,012,131
Patented Dec. 5, 1961

3,012,131
CARBON ARC TORCH
Jack D. Forney, 1816 Laporte Ave., Fort Collins, Colo.
Filed Jan. 25, 1960, Ser. No. 4,476
16 Claims. (Cl. 219—139)

This invention relates to carbon arc torches, namely heating apparatus in which the heat is produced by an arc struck between two electrodes, normally formed of carbon. Such a torch may be used for welding, brazing, soldering, preheating, burning away metal and the like.

In a carbon arc torch, a high temperature is produced by the electrical arc which extends between the ends of two electrodes, which must necessarily be positioned so that the closest approach of one electrode to the other is at the end between which the arc extends, since otherwise the arc might extend between the electrodes at other points, rendering it difficult to supply heat to the desired area. Conveniently, the electrodes are positioned in divergent relation to each other, but it is necessary to move the ends of the carbon electrodes toward each other, when the arc is initially struck, then move the ends further apart, in order to produce and maintain the desired arc. As the heating operation proceeds and the arc continues in operation, the electrodes are consumed, so that it is necessary to adjust the position of the electrodes, in order to maintain the desired spacing between the ends thereof for the arc. Needless to say, if the heating operation must be stopped for adjustment of the electrodes each time the carbons have been sufficiently consumed to require adjustment, the operation cannot proceed satisfactorily. Furthermore, since one hand of the welding operator may be used in holding the torch and the other hand is often engaged in other tasks, it is desirable that the operator be able to adjust the electrodes with the same hand in which the torch is held. However, it is undesirable if the operator is required to shift the position of the hand holding the torch, in order to adjust the electrodes. Since the conductors for the electric current for the electric arc most conveniently pass through the handle or the body of the torch, it is desirable that adequate insulating properties be provided. Also, the body or handle of the torch receives heat conducted from the carbon electrodes and therefore it is desirable that adequate provision be made to prevent overheating of the torch body or handle.

Among the objects of the present invention are to provide a novel carbon arc torch; to provide such a torch in which the carbon electrodes, between the ends of which the arc extends, may be readily adjusted; to provide such a carbon arc torch in which such adjustment may be made with the same hand with which the operator holds the torch; to provide such a torch in which such adjustment may be made without requiring the operator to shift his grip on the torch; to provide such a torch which is adequately electrically insulated; to provide such a torch in which provision is made to prevent overheating, particularly the end of the torch body or handle adjacent the electrodes; to provide such a torch which is effective and efficient in operation; to provide such a torch which is readily assembled and disassembled; and to provide such a torch which is readily manufactured and serviced.

Additional objects and the novel features of this invention will become apparent from the description which follows, taken in connection with the accompanying drawings, in which.

Figure 1:
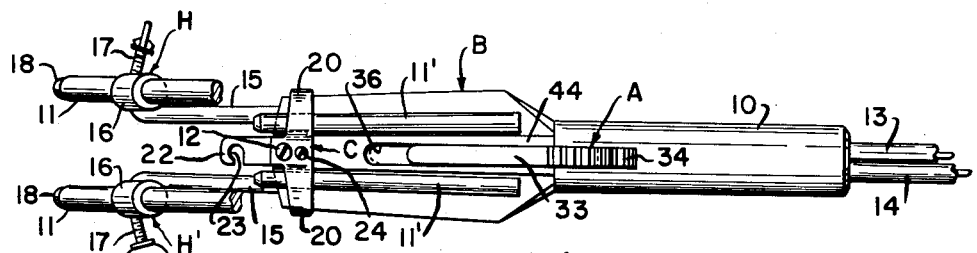
FIG. 1 is a top plan view of a carbon arc torch constructed in accordance with this invention.
Figure 2:
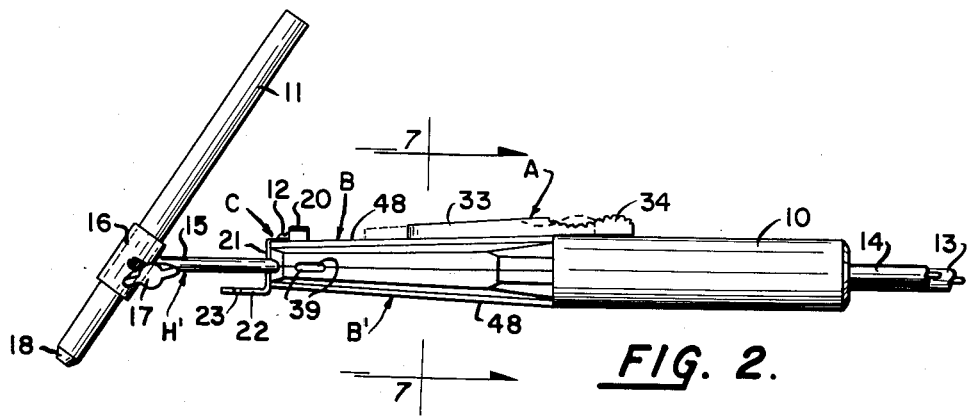
FIG. 2 is a side elevation of the torch of FIG. 1.
Figure 3:
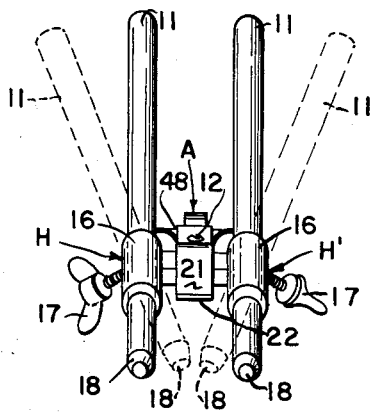
FIG. 3 is a front elevation of the torch of FIG. 1, with the carbon electrodes shown in full in spaced apart position and also in dotted lines with the ends thereof in adjacent position.

As illustrated in FIGS. 1-3, a carbon arc torch constructed in accordance with this invention may include a handle or housing comprising an upper block B and a lower block B', secured together at the rear end by a sleeve 10 and from which extends forwardly a pair of carbon rod holders H and H', on the outer end of each of which a carbon rod 11 is mounted. The blocks B and B' may be secured together at the front end by a screw 12, while insulated conductors 13 and 14 extend within sleeve 10 for connection to the respective holders H and H' within the blocks. Conductors 13 and 14 may be connected to appropriate taps of a welding transformer, or to any other suitable source of current. The cooperation of sleeve 10 with blocks B and B' is a novel feature of this invention, which will be described in detail later, but in general sleeve 10 has a friction fit on the blocks B and B' and provides a convenient place for the operator to grasp the handle with one hand, as with the fingers placed around the sleeve and the thumb on an adjustment slide A, so as to move the slide between the full and dotted positions of FIGS. 1 and 2. Thus, by a simple thumb movement and without altering or relinquishing his grasp of the handle with his fingers around sleeve 10, the operator is able to cause the holders H and H' to pivot, with the carbon rods 11 along with them, so that the carbon rods 11 will be moved, as from the full position to the dotted position of FIG. 3. The carbon rods 11 may be conventional in construction, such as formed of compressed carbon covered by an outer sheath of brass, copper or the like. The holders H and H' are similar but complementary in construction, each including a longitudinally extending rod 15 provided at its outer end with an angularly disposed sleeve 16, in which a thumb screw 17 may be threaded, for clamping rod 11 in a position in the holder such that the lower end 18 of each rod, from which the sheath is removed initially and a blunt or pointed end of the carbon formed, will be spaced an equal distance from the respective sleeve 16. With the adjustment slide A in the retracted or full position of FIGS. 1 and 2, the rods 11 will be parallel, as shown in FIG. 1 and in full in FIG. 3, so that rods 11 may be adjusted to extend for any desired distance through sleeves 16. However, by moving the adjustment slide A forwardly, the holders H and H' will be rotated until the ends 18 of carbon rods 11 touch or closely approach each other. With current flowing through conductors 13 and 14, when the ends 18 touch or closely approach each other and are then slightly separated, as to the dotted position of FIG. 3, an arc will be struck and maintained between the ends 18. As the carbon of rods 11 is consumed, the outer metal sheath will also be consumed, so that the portion of each rod projecting beyond the sleeve 16 will diminish in length. However, the operator can merely push forwardly on the adjustable slide A with his thumb, so that each holder H and H' will pivot further, thereby again moving the ends of the rods 11 toward each other and to the desired spacing. The adjustment slide A also permits adjustment of rods 11 toward and away from each other for producing more heat by a slightly shorter arc or less heat by a slightly longer arc. Other adjustments of the heat produced may be obtained by connecting the conductors 13 and 14 to different taps of a welding transformer, for instance, so that different voltages will be supplied.

For convenience, a clip C may be attached to the upper block B, at the front end thereof, and include a wing clip 20 at each side, for holding a pair of carbon rods 11', such as of a smaller size than rods 11. The front of clip C may also extend over the front end of the handle, as a downwardly extending flange 21, then forwardly as a flange 22, provided with a lateral slot 23, to permit the torch to be hung on a hook or the like, when not in use. While screw 12 preferably extends through clip C, the clip may also be attached to the upper block B by a smaller screw 24, so that clip C will remain with the upper block when the upper and lower blocks are separated.

Figure 4:
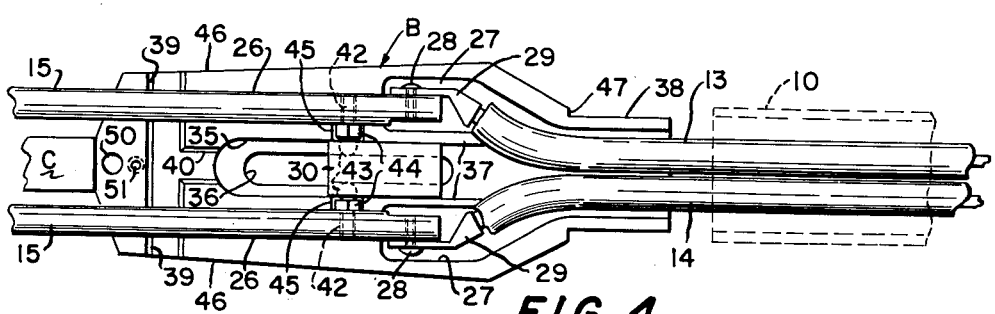
FIG. 4 is a bottom plan view, on an enlarged scale, of the handle portion of the torch of FIG. 1, with the lower half of the handle removed.
Figure 5:
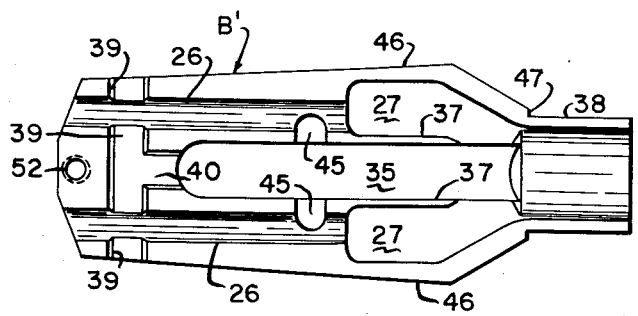
FIG. 5 is a top plan view of the lower half of the torch handle.

As shown in FIGS. 4 and 5, the upper block B and lower block B' are similar in construction and are each provided with a pair of spaced, longitudinally extending, semicircular slots 26 which, with the blocks together, form cylindrical holes, each extending from the front end of the blocks to a cavity formed by a deeper and laterally enlarged slot 27 in each block. The rods 15 of holders H and H' are received in the holes formed by slots 26 and extend into the cavities formed by the deeper and wider slots 27, in the latter of which the respective conductors 13 and 14 may be attached directly to the corresponding rod 15, as by a screw 28 and a conventional electrical connection clip 29. As will be evident, the cavity formed by the deeper and wider slots 27 permits the connection between the conductor 13 or 14 and the corresponding rod 15, i.e., the screw 28 and connection clip 29, to rotate without interference.

Figure 6:
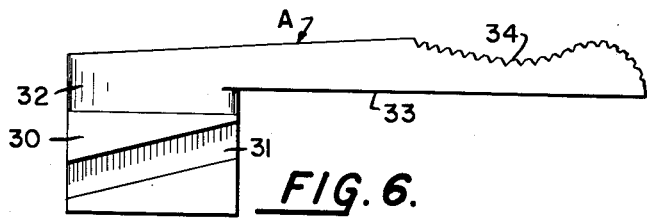
FIG. 6 is a side elevation, on an enlarged scale, of an actuating member.
Figure 7:
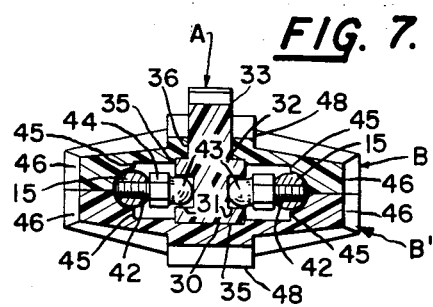
FIG. 7 is a cross section taken along line 7—7 of FIG. 2.

The adjustment slide A is provided with a rectangular lower block 30, as in FIGS. 6 and 7, provided with an inclined groove 31 on each side which conveniently slopes upwardly from front to rear. Block 30 is surmounted by an upwardly extending neck 32, from which an arm 33 extends rearwardly and over the forward portion of sleeve 10. The rear upper edge of arm 33 is provided with a curved, serrated edge 34, for convenience of engagement with the thumb of the operator. The block 30 of the adjustment device A is received within a rectangular cavity formed by a longitudinally extending well 35 in each of blocks B and B', while neck 32 extends upwardly through a slot 36 in the upper block B, having a sufficient longitudinal extent to accommodate the movement of the adjustment slide A between the full and dotted positions of FIG. 2. In each block, a wall 37 separates well 35 from slots 27, which merge rearwardly of the walls 37, while a continuation of this space is formed by the interior of a hollow, semicylindrical rear flange 38, which together have an inside diameter sufficient to accommodate both conductors 13 and 14. In addition, flanges 38 have an outside diameter substantially equal to the inside diameter of sleeve 10, so that the sleeve will frictionally engage flanges 38 and hold the rear ends of blocks B and B' together. In order to dissipate heat conducted to the handle through rods 15, or received by radiation or convection, a shallow transverse groove 39 extends across the inner face of each block just rearwardly of the front end thereof and form an aperture at each side, as shown in FIG. 2. In addition, a shallow groove 40 extends forwardly from well 35 and into the groove 39 at the center. Thus, heat received by the front end of the handle will tend to be dissipated laterally through the outer ends of slots 39 and centrally through slots 40, then upwardly into well 35 in the upper block B and out through the front end of slot 36.

In further accordance with this invention, each rod 15 is provided with a laterally extending cam pin 42 of FIGS. 4 and 7 to engage slot 31 in the corresponding side of block 30 of adjustment slide A, conveniently having a screw threaded shank engaging a threaded hole in the corresponding rod 15 and having a ball 43 on its outer end engaging a slot 31 in block 30, as well as an integral nut or hexagonal section 44 which permits the cam pin to be tightened in position without damage to ball head 43. To restrain longitudinal movement of the rods 15 and to accommodate pivotal movement of the respective cam pin, in each block opposite transverse wells 45 extend between the central longitudinal well 35 and the longitudinal slots 26. As will be evident, longitudinal movement of adjustment slide A and particularly the lower block 30 thereof will cause ball heads 43 of the cam pins 42 to move upwardly or downwardly simultaneously, depending upon whether the adjustment slide A is moved forwardly or rearwardly, which will cause rods 15 of holders H and H' to pivot and thereby move ends 18 of the carbons 11 respectively toward or away from each other.

The side edges 46 of each of the upper and lower blocks B and B' may diverge outwardly from the front toward the rear, to provide additional space for slots 27, then converge to a shoulder 47 against which the front end of sleeve 10 abuts, when holding the upper and lower bodies B and B' together. The top of body B and the bottom of body B' may be inclined respectively upwardly and downwardly, while each may be provided with a central ridge 48, opposite the respective longitudinal well 35, to maintain sufficient thickness of wall structure, it being noted that slot 36 for neck 32 of adjustment slide A extends through ridge 48 of the upper block B, as in FIG. 7. As will be evident, the upper block B and the lower block B' are thus similar in construction, except that the lower block B' is not provided with the slot 36 in well 35, the upper block B' is provided with an unthreaded hole 50 through which screw 12 passes and a threaded hole 51 for screw 24, while lower block B' is provided with a threaded hole 52 engaged by screw 12.

The parts of the carbon arc torch of this invention may be made of suitable material. For instance, blocks B and B', adjustment slide A and sleeve 10 should be formed of an insulating material, such as a resin of the phenolic type reinforced by non-metallic, non-conductive material, conveniently fibrous or woven. The clip C may be made of metal, while rods 15 and sleeves 16 of each of holders H and H' are, of course, made of electrically conductive material, such as metal, and conveniently steel.

As will be evident, a carbon arc torch of this invention fulfills to a marked degree the requirements and objects hereinbefore set forth. The carbon rods 11 may be readily adjusted, merely by moving the adjustment slide A, which may be done with the thumb or one finger of the same hand with which the operator holds the torch, thus eliminating the necessity for the operator to shift his grasp on the torch for adjustment. By making bodies B and B' and the adjustment slide A, as well as sleeve 10, of insulating material, adequate electrical insulation is provided for the current passing through the conductors and particularly the longitudinal rods 15 of holders H and H'. Through the provision of a transverse ventilating slot in the front end of the torch, conveniently provided by grooves in the inner face of the two body halves, overheating of the torch handle is avoided, particularly with respect to heat conducted back to the torch handle through the holder rods, which must necessarily be formed of metal. The torch of this invention is effective and efficient in operation, since considerable adjustment of the carbon rods toward each other may be produced, to maintain the length of arc desired, before any adjustment of the carbon rods within their holders is necessary. One of the advantages of moving both carbon rods simultaneously toward and away from each other, instead of merely adjusting a movable rod with respect to a fixed rod, is that the ends of the rods may be brought into juxtaposition automatically, merely by rotating the rod holders, rather than rotating one movable rod and having to adjust a relatively fixed rod longitudinally thereof. The use of a sleeve to hold the upper and lower blocks together at the rear end and a single screw to hold the bodies together at the front end, permits the handle to be disassembled by merely slipping the sleeve 10 rearwardly and removing the screw, to provide access to the parts within the handle, so that repair or replacement of parts is readily accomplished. The torch is also readily assembled, since arm 33 of adjustment device A can be slipped through slot 36 and the upper portion of block 30 placed in well 35 of the upper block, then ball heads 43 of the cam pins inserted in slots 31 and rods 15 placed in the longitudinal slots 26, after which the lower block B' may be placed against the upper block and sleeve 10 slipped into position, after which screw 12 may be inserted and tightened. Sleeve 10 is, of course, preferably slipped over conductors 13 and 14 before attaching clips 29 to rods 15. In addition, since the parts formed of insulating material can be molded and the parts formed of metal can be readily fabricated, the torch parts are readily manufactured.

Although a preferred embodiment has been illustrated and described, it will be understood that other embodiments may exist and that various changes may be made therein, all without departing from the spirit and scope of this invention.

What is claimed is:

1. A carbon arc torch comprising a handle; a pair of spaced, longitudinally extending holders for carbon rods pivotally movable in said handle and extending forwardly therefrom, each said holder being provided with means for holding a carbon rod disposed generally transversely of the pivotal axis of said holder; an electrical conductor extending within said handle and connected to each of the respective holders; cam means within said handle for pivoting said holders simultaneously about the respective longitudinal axes thereof; and actuating means operatively connected to said cam means and extending exteriorly of said handle.

2. A carbon arc torch as defined in claim 1, wherein said actuating means is movable longitudinally of said handle.

3. A carbon arc torch as defined in claim 2, wherein said actuating means is engageable by the thumb of an operator while grasping the torch handle with one hand.

4. A carbon arc torch comprising an upper block and a lower block; a pair of laterally spaced, longitudinally extending carbon rod holders mounted for pivotal movement between said blocks, said blocks having slots therein to accommodate said holders and said holders extending forwardly from said blocks, the front end of each holder being provided with means for securing a carbon rod thereto disposed generally transverse to the axis of said holder; a pair of electrical conductors extending within said handle and connected to the respective holder, said blocks being provided with opposed cavities accommodating said conductors and the connection thereof to said holders; and a hollow sleeve encircling said conductors, each said block being provided with a rearwardly extending flange fitting within the front end of said sleeve and said sleeve thereby being adapted to hold the rear ends of said blocks together.

5. A carbon arc torch as defined in claim 4, including fastening means for attaching the front ends of said blocks together.

6. A carbon arc torch comprising upper and lower blocks; a pair of holders spaced laterally and extending longitudinally between said blocks, said blocks having longitudinal slots forming passages to receive said holders for pivotal movement therein, each said holder extending forwardly from said blocks and being provided adjacent the forward end with means for attaching a carbon rod thereto in generally transverse relation to the pivotal axis of said holder; means for supplying electric current to said holders; a slide movable longitudinally within said blocks, said blocks having opposed wells which form a space receiving said slide, one said block having a slot extending therethrough from said well therein and said slide having a portion extending through said slot and exteriorly of said block for access by the operator; and means actuated by said slide and connected to the respective holders for pivoting said holders simultaneously about the longitudinal axes thereof upon longitudinal movement of said slide.

7. A carbon arc torch as defined in claim 6, wherein said slide includes a block disposed in said space and provided on each opposite side thereof with an angular slot; and said pivoting means includes a pin extending laterally from each said holder and provided with a head engaging the corresponding slot of said block.

8. A carbon arc torch as defined in claim 6, including a sleeve extending rearwardly from said block; and wheredin the extending portion of said slide extends over said sleeve.

9. A carbon arc torch as defined in claim 6, wherein at least one block is provided with a laterally extending groove adjacent the front end thereof connecting with the passages in which said holders are received, to permit the dissipation of heat conducted through said holders.

10. A carbon arc torch as defined in claim 6, including a clip attached to one of said blocks adjacent the front end thereof, said clip having lateral flanges disposed in spaced relation to said block and adapted to secure auxiliary carbon rods to said block; and a front flange provided with a lateral slot for supporting said torch by said clip when not in use.

11. A carbon arc torch comprising an upper block and a lower block disposed in abutting relationship, the abutting surfaces of said blocks being each provided with a pair of laterally spaced, semicircular grooves extending longitudinally from the front end of each said block, said grooves being adapted to form a pair of laterally spaced, cylindrical passages, a longitudinally extending well disposed between said slots, said wells being adapted to form a rectangular cavity, a larger slot rearwardly of each said longitudinal slot and having a greater width and depth than the corresponding longitudinal slot, said larger slots merging rearwardly of said well and providing larger passages; a pair of holders, each including a cylindrical rod disposed in one of said cylindrical passages, each said holder being provided with an angularly disposed sleeve at the front end thereof and adjustable means for attaching a carbon rod to said holder within said sleeve; a pair of electrical conductors extending from the rear end of said blocks into said larger passages, each conductor being connected to one of said rods within the corresponding larger slots, said blocks being formed of insulating material and said rod being formed of electrically conductive material; a slide having at least a portion thereof disposed in the cavity formed by said wells and movable longitudinally therein; means for moving said slide longitudinally; and means for pivoting said rods simultaneously about the longitudinal axes thereof upon longitudinal movement of said slide.

12. A carbon arc torch as defined in claim 11, wherein each said block is provided with a lateral groove in said abutting surface adjacent the front end thereof, said lateral groove forming a passage crossing said longitudinal holes for dissipation of heat conducted through said rods; and the abutting surface of each said block is provided with a groove extending longitudinally from said lateral groove to said well.

13. A carbon arc torch, as defined in claim 11, wherein each said block is provided with a semicylindrical rear flange; and including a cylindrical sleeve, formed of electrically insulating material and through which said conductors extend, said sleeve surrounding and engaging said rear flanges of said blocks to hold the rear ends of said blocks together; and a single screw for removably attaching the front ends of said blocks together.

14. A carbon arc torch, as defined in claim 13, wherein said upper block is provided with a longitudinal slot extending from said well through the top of said upper block; and said slide is provided with a neck extending through said last mentioned slot and an arm extending rearwardly from said neck and over said sleeve, the rear upper surface of said arm being curved and provided with transverse serrations for engagement by a thumb or finger of an operator grasping said sleeve.

15. A carbon arc torch as defined in claim 11, wherein the sides of each block flare outwardly from the front toward the rear to accommodate said larger slots; and an upstanding ridge extends longitudinally of the top of said upper block and the bottom of said lower block, opposite the central well in the respective block.

16. A carbon arc torch, as defined in claim 11, wherein said slide includes a rectangular block disposed in said well cavity and provided on each side with an angular slot extending upwardly from front to rear; and said means for pivoting said rods includes a pin extending transversely from each said rod and having a ball shaped head engaging the corresponding angular slot in the side of said slide block and a portion having flat sides inwardly of said head, said pin being provided with threads and the corresponding rod having a hole provided with corresponding threads; and each said block is provided with a lateral well extending from said central well to each said longitudinal slot, said lateral wells being in lateral alignment and having a sufficient extent to accommodate movement of said flat sided portion of the corresponding pin.

References Cited in the file of this patent

UNITED STATES PATENTS

| | | |
|---|---|---|
| 1,898,481 | D'Amico et al. | Feb. 21, 1933 |
| 2,520,151 | Landis et al. | Aug. 29, 1950 |